United States Patent
Karlsson et al.

(10) Patent No.: US 7,732,943 B2
(45) Date of Patent: Jun. 8, 2010

(54) METHOD AND A DEVICE FOR SELECTING AND DIMENSIONING MEASURES IN A CASE OF INSTABILITY IN AN ELECTRICAL POWER SYSTEM

(75) Inventors: Daniel Karlsson, Malmö (SE); Sture Lindahl, Lund (SE)

(73) Assignee: ABB AB, Västerås (SE)

( * ) Notice: Subject to any disclaimer, the term of this patent is extended or adjusted under 35 U.S.C. 154(b) by 549 days.

(21) Appl. No.: 10/585,126

(22) PCT Filed: Dec. 23, 2004

(86) PCT No.: PCT/SE2004/002002

§ 371 (c)(1),
(2), (4) Date: Jun. 13, 2007

(87) PCT Pub. No.: WO2005/064761

PCT Pub. Date: Jul. 14, 2005

(65) Prior Publication Data

US 2007/0257561 A1 Nov. 8, 2007

(30) Foreign Application Priority Data

Dec. 31, 2003 (SE) .................................... 0303619

(51) Int. Cl.
*H02J 3/14* (2006.01)

(52) U.S. Cl. ............................. 307/39; 307/29; 307/85; 307/86; 700/295

(58) Field of Classification Search .................... 307/29, 307/39, 85, 86; 700/295
See application file for complete search history.

(56) References Cited

U.S. PATENT DOCUMENTS

| 4,075,699 | A | * | 2/1978 | Schneider et al. ............ 700/291 |
| 4,324,987 | A | * | 4/1982 | Sullivan et al. ................ 307/35 |
| 6,219,591 | B1 | | 4/2001 | Vu et al. |
| 6,242,719 | B1 | | 6/2001 | Kano et al. |
| 6,476,521 | B1 | | 11/2002 | Löf et al. |
| 6,496,757 | B1 | | 12/2002 | Flueck et al. |
| 2001/0010032 | A1 | * | 7/2001 | Ehlers et al. ................... 702/62 |
| 2004/0010350 | A1 | * | 1/2004 | Lof et al. ..................... 700/292 |

FOREIGN PATENT DOCUMENTS

WO    WO-02/078147 A1    10/2002

OTHER PUBLICATIONS

Miroslav Begovic et al; A Novel Method for Voltage Instability Protection; 2002 IEEE Computer Society; 10 pages.
Bertil Ingelsson et al; CIGRE 1996: 38-105, Special Protection Scheme against Voltage Collapse in the South Part of the Swedish Grid; 8 pages.

* cited by examiner

*Primary Examiner*—Albert W Paladini
*Assistant Examiner*—Hal I Kaplan
(74) *Attorney, Agent, or Firm*—Venable LLP; Eric J. Franklin

(57) ABSTRACT

A method for determining/dimensioning measures for restoring an electrical power system, which experiences or is heading for a voltage instability, to a steady-state condition, wherein there is no immediate risk of instability. An actual voltage/phase angle in the electrical power system is determined. The power unbalance within at least one sub-area in the electrical power system is determined. Suitable power-balancing measures are determined. The extent of the respective measures is determined. The power-balancing measures are carried out. Also, a device for carrying out the method.

26 Claims, 4 Drawing Sheets

| Switching member | Priority | Active Power [MW] | Reactive Power [Mvar] |
|---|---|---|---|
| Br_Nisse | 1 | Pxx.x | Qxx.x |
| Br_Sixten | 1 | Pyy.y | Qyy.y |
| Br_Elsa | 2 | Pzz.z | Qzz.z |
| Br_Johanna | 2 | Pww.w | Qww.w |
| ............ | ..... | ........... | ........... |
| ............ | ..... | ........... | ........... |
| Br_Patrik | 17 | Puu.u | Quu.u |
| Br_Isabella | 17 | Pvv.v | Qvv.v |

Figure 4

| Switching member | Priority | Active Power [MW] | Reactive Power [Mvar] |
|---|---|---|---|
| Br_Nisse | 1 | 3 | 1 |
| Br_Sixten | 1 | 2 | 0.6 |
| Br_Elsa | 2 | 8 | 2.6 |
| Br_Johanna | 2 | 1 | 0.3 |
| Br_Patrik | 2 | 2 | 0.6 |
| Br_Isabella | 2 | 4 | 1.3 |
| Sum: | | 20 | 8.9 |

METHOD AND A DEVICE FOR SELECTING AND DIMENSIONING MEASURES IN A CASE OF INSTABILITY IN AN ELECTRICAL POWER SYSTEM

CROSS-REFERENCE TO RELATED APPLICATIONS

This application claims priority to Swedish patent application 0303619-1 filed Dec. 31, 2003 and is the national phase under 35 U.S.C. §371 of PCT/SE2004/002002 filed Dec. 23, 2004.

TECHNICAL FIELD

The present invention relates to a method for protecting an electrical power system which is in an unstable condition and which is heading for voltage collapse, as well as for selecting and dimensioning those measures that need to be taken for the electrical power system to attain voltage recovery and return to a stable condition.

The measures that may need to be taken according to the method are controlled disconnection of certain load from the electrical power system or connection of additional power to the electrical power system, or a combination of these measures.

The invention also relates to a device for carrying out the method according to the invention, wherein the device comprises electronic measuring and control equipment intended to be used in an electrical power system.

BACKGROUND OF THE INVENTION AND PRIOR ART

It is already known to plan, dimension and design an electrical power system for normal as well as disturbed operation by using dimensioning criteria, set in advance, for various system quantities, such as operating voltage and mains frequency.

The voltage levels of the electrical power system at different network points or nodes constitute a measure of the condition of the electrical power system, that is, the ability of the system to continue to supply the loads of connected areas with the desired power. During normal operation, the operating voltage at a network point or a node is to lie within a pre-allowed interval, normally within a few percent of the stated nominal voltage. Examples of normally occurring nominal voltages are 400 kV, 130 kV and 50 kV. The construction, function, operation, automatic and protective equipment of an electrical power system are described, as far as Swedish conditions are concerned, in our Swedish patent SE 0101061-0 entitled "An electric power plant with means for damping power oscillations".

In case of disturbances in the electrical power system, preferably when the transmission capacity is weakened or decreasing, but also in the event of loss of electricity production plants or loss of other components with a voltage-controlling function, and combinations of these, the voltage distribution in the electrical power system is changed in such a way that the voltage level across the loads drops, which leads to a drop also of the voltage level in the transmission network. The corresponding phenomena may also arise in case of too fast a load increase.

Common in both cases is that the electrical power system is not capable, in the steady state, to supply the load connected to the network. Unless measures are taken, the different component-protective functions of the electrical power system, which are adapted to react on changes in voltages and/or currents, will successively disconnect components in the electrical power system. Normally, disconnection of transmission lines is the first thing that happens. Disconnection of components may occur over time, from a few seconds up to several hours.

A typical scenario is that the voltages at the measuring points of the impedance-measuring line protection device decrease and the currents increase, whereby the most sensitive measuring zone of the protection device disconnects the line in question. The remaining lines, in the network thus weakened, are then further loaded, whereby more transmission lines are disconnected. This proceeds until the remaining electrical power network is able to maintain a constant electricity operation and achieve a balance between production, transmission capacity and load.

Examples of events such as those mentioned above are the major power failures in the USA/Canada, Sweden and Italy in 2003. Scenarios such as those described above are, of course, desirable to avoid and there are a plurality of methods to detect incipient voltage instability in an electrical power system. In such systems, voltages and reactive power flows are measured, and devices for limiting the current on generators for detecting voltage instability have also been used, see, for example, Ingelsson, Karlsson, Lindström, Runvik, Sjödin: "Special Protection Scheme against Voltage Collapse in the South Part of the Swedish Grid", CIGRE Conference, Paris, 1996.

Still more advanced detectors, with or without possibilities of communication, have been presented and tested. One such example is the so-called VIP algorithm (Voltage Instability Predictor) described in Begovic, Milosevic, Novosel: "A Novel Method for Voltage Instability Protection", Proceedings of the 35$^{th}$ Hawaii International Conference on System Sciences, 2002. This system compares the impedance at a certain network point, in the direction of the load, with the impedance in a direction towards the production source. The relation between the load impedance, thus measured, and the source impedance may then be used as a measure for detecting incipient voltage instability.

One common method, which is efficient in this context, for mitigating or preventing voltage instability, after such instability has been detected, is to disconnect parts of the load in the network. By disconnecting a load corresponding to some ten percent of the total load in the inflicted area, the remaining load may often be adequately supplied. By intentionally and in a controlled manner disconnecting some load objects in a stressed operating situation, at least the operation of the major part of the inflicted area is saved, while at the same time the transmission network is kept energized and intact. The disconnected loads may be energized more rapidly again when stability has been resumed, for example by switching operations in the network and start-up of local electricity production.

By selecting and determining in advance what load objects are to be disconnected and in what sequence, a possibility is obtained of selecting objects such that the harmful effects in the system are limited. A frequency-controlled load disconnection for disconnection of load objects at too low or decreasing frequency is already available in most electrical power systems, that is, when the balance between actual electricity production and the desired consumption has been disrupted, for example in case of a major loss of production.

Other measures than load disconnection, such as the connection of shunt reactors and shunt capacitors, the connection of emergency power via dc links, etc., may also be used.

Existing non-connected electric power-generating objects cannot be connected to the transmission network if the line voltage is lower than a lowest value given in advance. For this reason, it may be necessary to disconnect part of the load such that reserve power plants may then be connected. These reserve power plants may then be used to increase the reactive generation and additionally increase the line voltage. In addition, they are to deliver active power and make it possible again to connect the previously disconnected load without the balance between production and consumption being lost.

With a view to designing a selective protection against voltage instability, based on the use of load disconnection, primarily three questions need to be answered in view of the prevailing operating situation:

1) When should the load disconnection take place?
2) Where should the load disconnection take place?
3) How much load should be disconnected?

The voltage level is normally a sufficiently good criterion for determining where the load disconnection should take place.

Disconnection may take place "without unnecessary delay", that is, as quickly as possible after a margin has been allowed for reserve disconnection of a shunt fault, that is, short circuits and ground contacts. The speed should also be adapted to the speed of the on-load tap changer control of the power transformers connected in the vicinity thereof. The time delay should normally be a few seconds.

However, the extent of the load disconnection is more difficult to determine. One method is to proceed by trial and error by disconnecting one or more loads, load areas, at a time. This is a relatively slow method since the system response to each disconnection must be awaited.

Another method is to use a comfortable margin and disconnect a larger number of loads. The disadvantage of such a method is that an unnecessarily large part of the load is disconnected and also that this involves a risk of obtaining high voltages in the electrical power system.

At present, there is no known method of dimensioning or determining the magnitude of a necessary load disconnection, when the need of such a measure has been detected. The fulfilled criteria normally result directly in load disconnection via a preselected circuit-breaker function with a suitable time delay, typically a few seconds.

U.S. Pat. No. 6,219,591, "Voltage instability predictor (VIP)—method and system for performing adaptive control to improve voltage stability in power systems", shows a method for detecting that the power system, or parts thereof, is/are heading for instability. However, the method only mentions the need of load disconnection in general, as a suitable measure for how this threatening instability is to be cancelled or mitigated.

The invention according to U.S. Pat. No. 6,242,719, "Applications and methods for voltage instability predictor (VIP)", is a further development of the invention according to U.S. Pat. No. 6,219,591, which, among other things, relates to masked transmission networks. However, none of these publications suggests any measure of magnitude of that quantity of load disconnection that is required for stabilizing the system.

Several patent specifications deal with the VIP algorithm, which suggest stability measures of various kinds and predict an imminent voltage collapse, but do not suggest the extent of or magnitude of the load disconnection that is necessary to prevent a power failure or a collapse in the electrical power network.

OBJECTS AND MOST IMPORTANT CHARACTERISTICS OF THE INVENTION

The object of the present invention is to solve the above-mentioned problems and suggest a method for determining the extent of the load that needs to be disconnected from the electrical power network or the power that needs to be supplied to the electrical power network for the purpose of achieving voltage recovery in the electrical power network and to cause the system to resume a stable state.

The above object and further objects are achieved according to the invention by a method, by a device, and by a computer program.

BRIEF DESCRIPTION OF THE ACCOMPANYING DRAWINGS

The invention will be described in greater detail below with reference to the accompanying figures.

FIG. 1 shows, in principle, an electrical power system.

FIG. 2 schematically shows an electrical power system comprising a transformer station, loads, switching means and a unit according to the invention.

FIG. 4 shows a priority table of various loads included in the electrical power system which may be disconnected, and their mutual order.

FIG. 5 shows a concrete arithmetical example of a load disconnection.

DESCRIPTION OF PREFERRED EMBODIMENTS OF THE INVENTION

In the description, the same designations are used for the quantities that occur in lines, protective devices and loads, as for the measured values and signals/calculated values which correspond to these quantities and which are supplied to and treated in the protective device.

Figure 1:
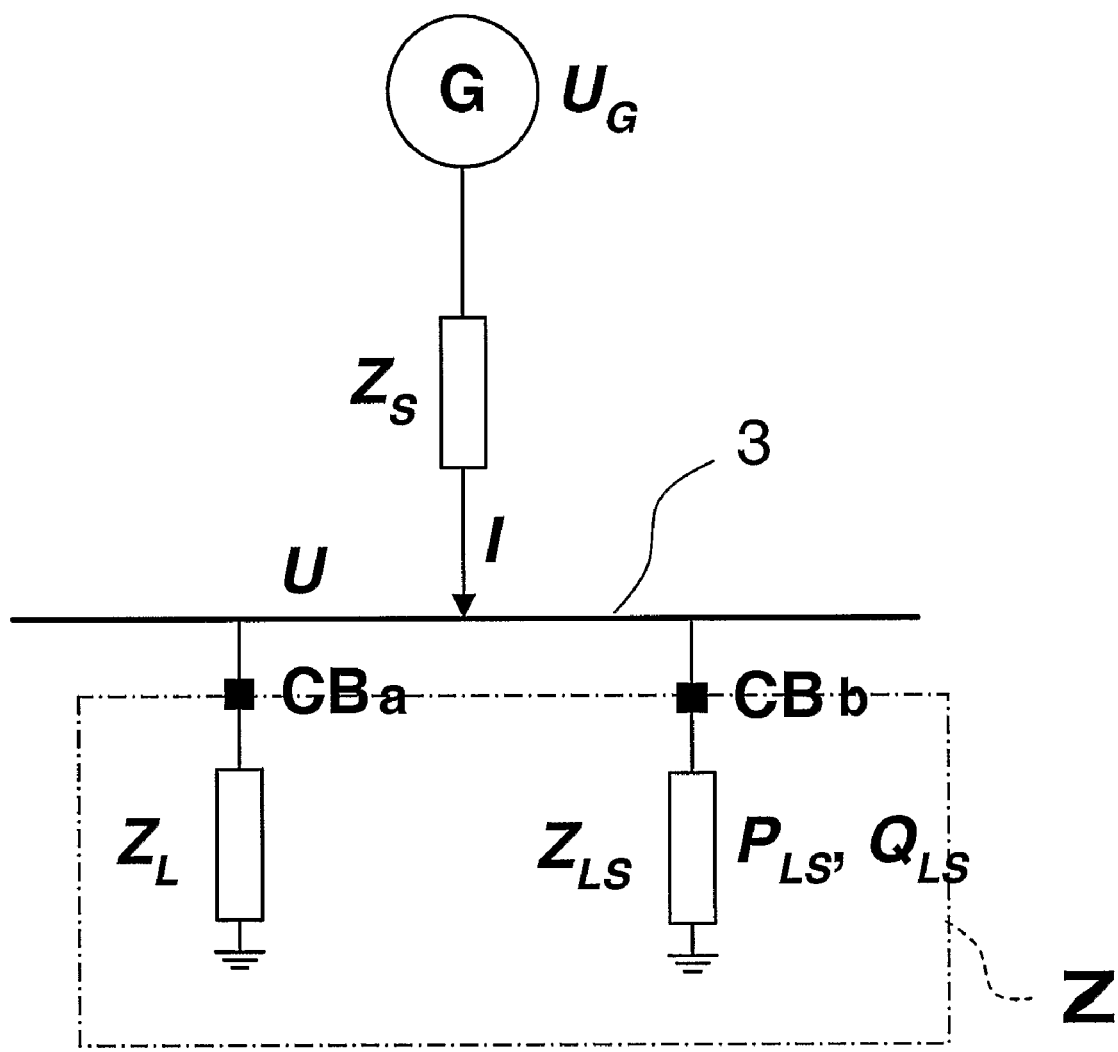

FIG. 1 shows a single-line diagram of an electrical power system 1 comprising an equivalent generator G which delivers the voltage $U_G$ to the electrical power system and which has a source impedance $Z_S$, as viewed from a busbar 3. The busbar 3 functions as a nodal point in the electrical power network and collects and distributes the electric power flow.

The load Z is here divided into one part which is to remain undisturbed, $Z_L$, and one part which is to be disconnected, $Z_{LS}$, in case of voltage instability. Both that part of the load $Z_{LS}$ which is to be disconnected and that part of the load $Z_L$ which is to continue to be connected are normally constituted by a plurality of line bays with associated circuit breakers CBa,b.

A calculation of the voltage $U_G$ behind the source impedance $Z_S$ and the prevailing load impedance Z is made according to equations (1) and (2) below, where I is the current into the busbar 3 under consideration from source G, and U is the voltage prevailing on the busbar 3 under consideration:

$$U_G = U + I \cdot Z \qquad (1)$$

$$Z_L(//Z_{LS}) = \frac{U}{I} \qquad (2)$$

If $U_T$ designates the desired voltage, after load disconnection, an equation (3) for voltage division is obtained as follows:

$$\frac{U_G}{Z_S + Z_L} = \frac{U_T}{Z_L} \quad (3)$$

Equation (3) gives $Z_L$. Thereafter, $Z_{LS}$ may be calculated with the aid of equation (2), and thereafter the corresponding values of active and reactive power, $P_{LS}$ and $Q_{LS}$, respectively.

As soon as the required amount of load disconnection has been determined, a trigger impulse is sent to the switching member(s) CBa,b which best correspond(s) to the calculated required load disconnection. In this context, different disconnection costs or mutual priorities for different types of loads may also be taken into consideration. Information about the power consumption of different loads may be estimated with differing degrees of accuracy, from fixed values, which, for example, are updated in view of the season, to real-time measurements. Then, loads are chosen from a priority table established in advance; see FIG. 4, which shows the priority of the loads and the power levels occurring.

The value of $U_G$ may alternatively be regarded as known, or be calculated regularly, for example every $5^{th}$ minute, whereupon the calculation of the change of the source impedance $Z_S$ during a voltage instability scenario becomes trivial.

The source impedance $Z_S$ is calculated based on changes in voltage and current during, for example, tap-changer control or connection with shunt components. The source impedance $Z_S$ may also be estimated by measuring current and voltage at different load levels. If the above-mentioned continuous updating of the magnitude of the source impedance for some reason should be considered too complex, the source impedance $Z_S$ may also be assigned a definite value. In transformer stations from transmission level (or subtransmission level) to medium-voltage level, knowledge of the size and short-circuit impedance of the transformers is often insufficient to estimate the source impedance with an accuracy of ±25%, since the short-circuit power of the transformer in such cases is predominant and the short-circuit power of the rest of the network has a minor influence.

Another way of determining the source impedance $Z_S$ is to utilize negative-sequence quantities for current and voltage as well as assuming that the impedance of the source in relation to positive- and negative-sequence currents, respectively, is the same. In connection with the development of the VIP algorithm, methods have been obtained for determining the source impedance $Z_S$.

The method according to the invention may also be used step by step, for example if the voltage did not turn out to be the expected/calculated one at the nodal point in question after the first disconnection phase or if the impedance in supply networks increases and the voltage thus decreases at the monitored point.

According to the invention, this is achieved by determining the quantity of the load, or that part of the load, which is to be disconnected on the basis of measured actual voltage and desired voltage, at the node after the load disconnection.

With knowledge of measured and desired voltage, or voltage recovery, as well as actual load and source impedance $Z_S$—or a corresponding quantity such as, for example, source admittance—the required load disconnection, for achieving the desired voltage in the node again, may be obtained by a normal circuit calculation.

Voltage recovery may, for example, be the difference between voltage before load disconnection, that is, the "measured" voltage, and voltage after load disconnection, that is, the "desired" voltage, but it may also be defined as a percentage of the measured voltage.

The load disconnection takes place by circuit-breaker tripping or by means of other switching members. It is also feasible to use a centralized telecontrol system which, via a communication channel, orders disconnection of certain individual load objects, for example hot-water heaters, air-conditioning plants etc. Such ordering may also take place via a "price change/", wherein certain loads, via the communication system, react automatically on a price change.

Figure 2:
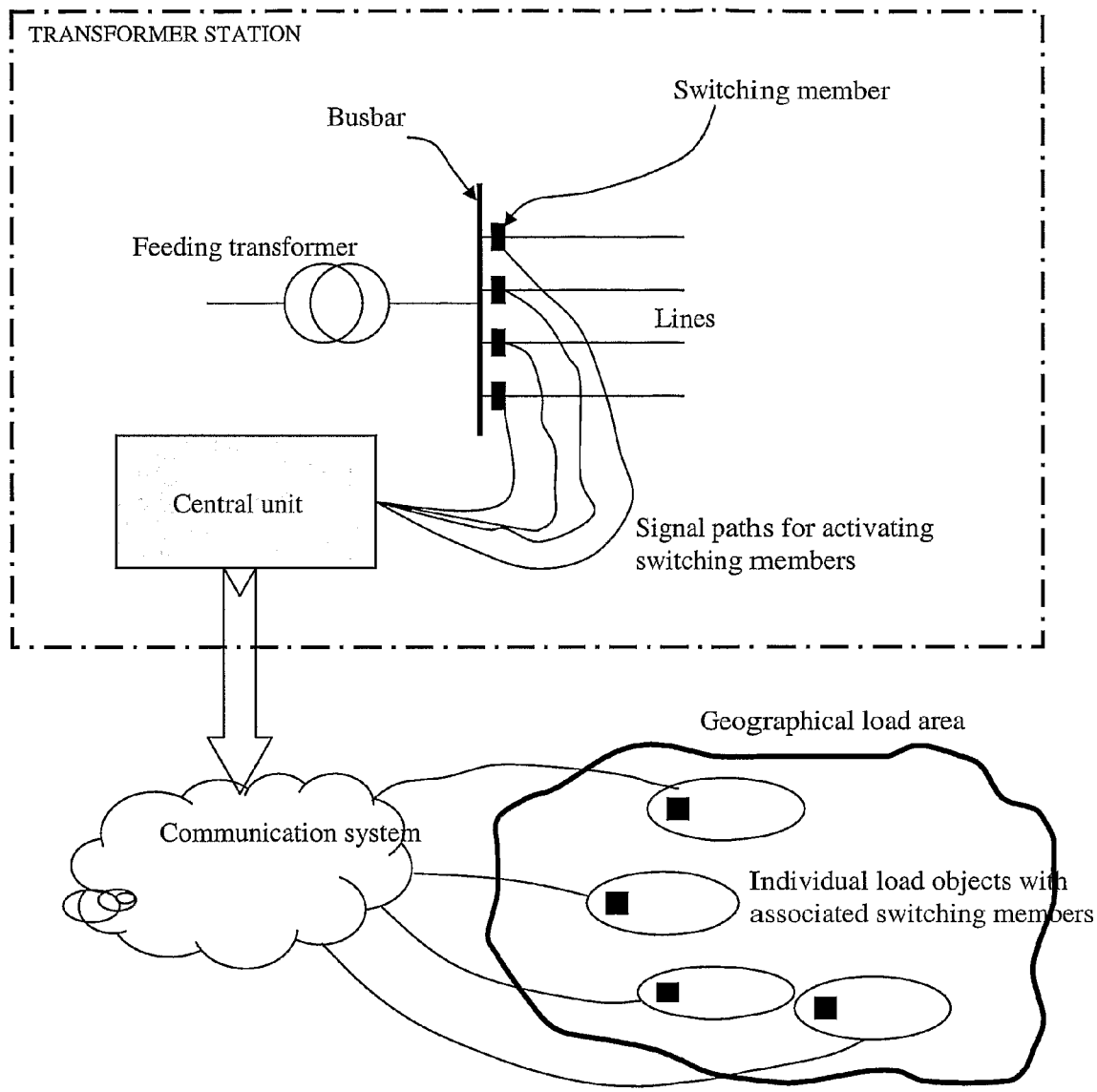

FIG. 2 schematically shows an embodiment of an electrical power system including a transformer station, loads, switching member and a central unit according to the invention. The transformer station includes a central unit connected via signal paths to switching members. The switching members can open or close connections between a busbar and respective lines. The busbar is further connected to a feeding transformer. The central unit is further connected via a communication system to a geographical load area with individual load objects with associated switching members.

Figure 3:
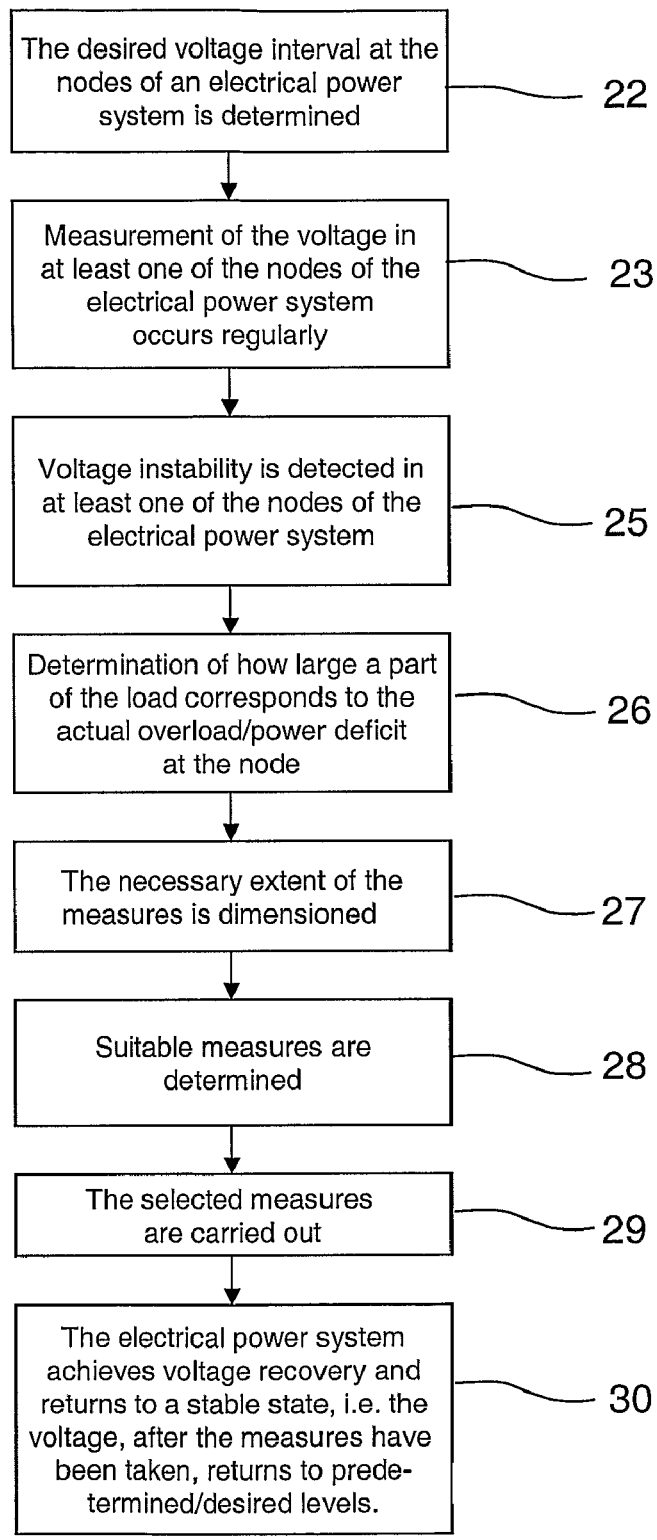
FIG. 3 is a simple flow diagram of the method according to the invention.

FIG. 3 is a simple flow diagram of an embodiment of a method according to the invention. Initially there is a step 22 for determining the desired voltage interval at the nodes of an electrical power system. This is followed by a step 23 which occurs regularly for measurement of the voltage in at least one of the nodes of the electrical power system. This is followed by a step 25 for detecting voltage instability in at least one of the nodes of the electrical power system. This is followed by a step 26 for determining how large a part of the load corresponds to the actual overload/power deficit at the node. This is followed by a step 27 for dimensioning the necessary extent of the measures. This is followed by a step 28 of determining suitable measures. This is followed by a step 29 of carrying out the selected measures. This is followed by a step 30 of the electrical power system achieving voltage recovery and returning to a stable state, i.e. the voltage, after the measures have been taken, returns to predetermined/desired levels.

In a preferred embodiment of the invention a table is used, comprising all switching members which are included in the load-disconnection system in question, which may comprise a larger geographical area or a single transformer station. The switching members are listed in the table in the order in which they are to be disconnected from the electrical power network in a position where instability has been detected. The order of priority is based, for example, on the cost of disconnecting the respective load.

The switching member in the example herein are called Br_Nisse. Br_Sixten, Br_Elsa, Br_Johanna, Br_Patrik, and Br_Isabella.

The table also contains information about the prevailing load power for the respective switching member, that is, how much power is disconnected during a switching-off operation with the respective switching member. In this way, the automatic control system runs through the list/the table to identify and operate those switching members, taken by order of priority, which restore the desired voltage in the node and the electrical power system with a minimum of costs/drawbacks.

The table is regularly updated, for example where necessary, manually with regard to the order of priority, and automatically and in real time with regard to the load per switching member.

The lines in the priority table in FIG. 4 are sorted by order of priority according to column 2. From the dimensioning algorithm, the magnitude of the load that needs to be disconnected is obtained. In the table, one or more switching members are selected in the order of priority, until the necessary amount of disconnected load has been achieved. Within the last selected group, the switching members may be selected so as to correspond to the necessary load in the best way.

FIG. 5 shows a concrete numerical example. The necessary load disconnection is here calculated to be 6 MW at $\cos \phi = 20/\sqrt{20^2 + 8.9^2} = 0.91$. Both switching members with priority 1 are thus chosen and each disconnects its load, in the same way as those switching members which have priority 2. The switching members which best correspond to the remaining three MWs are Br_Johanna and Br_Patrik.

In another preferred embodiment of the invention, the extent of the necessary power addition is dimensioned in the same way as for load disconnection, for example via a dc connection, in order to obtain, based on a certain actual measured voltage, a certain desired voltage in the node in question after the power addition, with knowledge of the source impedance in the node.

The method according to the invention may, at least partly, be carried out with the aid of program codes that are run in a processor or in a computer, and these program codes may be stored on a computer-readable medium such as a hard disk, a diskette, a CD-ROM, or any other volatile memory.

Although the invention above has been described by means of a few different embodiments, the invention is not limited thereto but other embodiments and variants thereof are, of course, feasible within the scope of protection of the claims. Thus, it is feasible for a device according to the invention to trigger an alarm signal in case of instability in the system, based on a suitable criterion, and for the load disconnection thereafter to be executed manually.

The invention claimed is:

1. A method for determining/dimensioning measures for restoring an electrical power system, which experiences or is heading for a voltage collapse, to a normal condition, the method comprising:
   determining an actual voltage/phase angle in the electrical power system,
   determining a power unbalance within at least one sub-area in the electrical power system,
   determining suitable power-balancing measures,
   dimensioning an extent of the respective measure, and
   carrying out the power-balancing measures.

2. The method according to claim 1, wherein the determination of the actual voltage/phase angle is performed by measuring in at least one node in the sub-area.

3. The method according to claim 1, wherein the determination of the actual voltage/phase angle in the electrical power system is performed by measuring in at least one node and by calculation.

4. The method according to claim 1, wherein the power unbalance is determined based on the actual voltage/phase angle and a desired voltage/phase angle.

5. The method according to claim 1, wherein the power unbalance is determined starting from a circuit calculation based on the actual and a desired voltage/phase angle.

6. The method according to claim 4, wherein the power unbalance is determined starting from a comparison of the actual voltage, the voltage drop across a magnitude related to the source impedance, and the equivalent voltage of the source.

7. The method according to claim 6, wherein the magnitude related to the source impedance is source impedance, source admittance, short-circuit power or short-circuit current.

8. The method according to claim 1, further comprising:
   disconnecting a load corresponding to the determined power unbalance, such that the voltage/phase angle returns to a desired/predetermined level.

9. The method according to claim 1, further comprising:
   supplying power, corresponding to the determined power unbalance, to the electrical power system such that the voltage/phase angle returns to a desired/pre-determined level.

10. The method according to claim 1, further comprising:
    redistributing power, corresponding to the determined power unbalance, within the electrical power system by controlling reactive power resources such that the voltage/phase angle returns to the desired level.

11. The method according to claim 1, wherein the power unbalance is determined based on a simultaneous comparison of the actual phase angle and a desired phase angle and of an actual voltage and a desired voltage.

12. The method according to claim 1, wherein determination/dimensioning of measures is based on the magnitude of the detected power unbalance and possible power-balancing means in an area.

13. The method according to claim 1, further comprising:
    addition of power to the electrical power system and disconnection of loads from the electrical power system are combined such that the power-balancing measures together correspond to the determined power unbalance.

14. The method according to claim 1, further comprising:
    performing disconnection of loads in a predetermined order of priority.

15. The method according to claim 1, further comprising:
    stating the order of priority in a table.

16. The method according to claim 15, wherein the table contains information about which switching members are available within the area.

17. The method according to claim 15, wherein the table contains information about what power change is caused by activation of respective switching members.

18. The method according to claim 15, further comprising:
    selecting a required number of switching members based on the information in the table, such that the necessary power change is achieved.

19. The method according to claim 15, wherein the table is regularly updated.

20. The method according to claim 8, wherein the load disconnection is executed manually.

21. The method according to claim 8, wherein the load disconnection is executed automatically.

22. A device for determining/dimensioning measures for restoring an electrical power system, which experiences or is heading for a voltage collapse, to a normal condition, the device comprising:
    actual voltage/phase angle determining means arranged for determining an actual voltage/phase angle in the electrical power system,
    power unbalance determining means arranged for determining a power unbalance within at least one sub-area in the electrical power system,
    power-balance measure determining means arranged for determining suitable power-balancing measures,
    dimensioning means arranged for dimensioning the extent of the respective measures, and
    restoring means arranged such that the selected measures can enable the electrical power system to be restored to a stable condition.

23. The device according to claim 22, further comprising:
    actual power balance determining means arranged to determine the actual power unbalance starting from a circuit calculation based on the actual voltage/phase angle and the desired voltage/phase angle.

24. A computer program product, comprising:

a computer readable medium; and computer program instructions recorded on the computer readable medium and executable by a processor for carrying out a method comprising determining an actual voltage/phase angle in the electrical power system, determining a power unbalance within at least one sub-area in the electrical power system, determining suitable power-balancing measures, dimensioning an extent of the respective measure, and carrying out the power-balancing measures.

25. The computer program product according to claim 24, wherein the computer program instructions are at least partly transferred via a network.

26. The computer program product according to claim 25, wherein the network is the Internet.

* * * * *